(12) United States Patent
Pilichi

(10) Patent No.: US 12,487,489 B2
(45) Date of Patent: Dec. 2, 2025

(54) ROAD VEHICLE PASSENGER CONTENT DISPLAY DEVICE AND RELATED ROAD VEHICLE AND CONTROL METHOD

(71) Applicant: FERRARI S.P.A., Modena (IT)

(72) Inventor: Alessandro Pilichi, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 18/177,945

(22) Filed: Mar. 3, 2023

(65) Prior Publication Data

US 2023/0288754 A1    Sep. 14, 2023

(30) Foreign Application Priority Data

Mar. 10, 2022   (IT) ................ 102022000004592

(51) Int. Cl.
*G02F 1/13357* (2006.01)
*B60K 35/10* (2024.01)
(Continued)

(52) U.S. Cl.
CPC ........ *G02F 1/133606* (2013.01); *B60K 35/10* (2024.01); *B60K 35/22* (2024.01);
(Continued)

(58) Field of Classification Search
CPC ...... B60K 2370/152; B60K 2370/1523; B60K 2370/1526; B60K 2370/52; B60K 2370/1529; B60K 35/00; B60K 2370/736; B60K 2370/739; B60K 2370/195; B60K 2370/25; B60K 37/00; B60K 2370/1534; G09G 2380/10; G09G 2320/068; G09G 2320/028; G02F 1/1323; G02F 1/133536;
(Continued)

(56) References Cited

U.S. PATENT DOCUMENTS 5,554,912 A * 9/1996 Thayer ................ H05B 39/042
315/157
6,697,201 B2 * 2/2004 Watanabe ............ G02F 1/1323
348/E9.027
(Continued)

FOREIGN PATENT DOCUMENTS

EP  3730333 A1  10/2020
FR  3074924 A   6/2019
(Continued)

OTHER PUBLICATIONS

Italian Search Report for Application No. 102022000004592; Filing Date—Mar. 10, 2022; Date of Mailing—Oct. 13, 2022, 7 pages.

*Primary Examiner* — Koosha Sharifi-Tafreshi
(74) *Attorney, Agent, or Firm* — CANTOR COLBURN LLP

(57) ABSTRACT

A content display device for a passenger of a road vehicle; the content display device comprising: a support element configured to be mounted on a dashboard of the road vehicle; at least one screen mechanically connected to the support element and configured so as to be visible to the passenger while the vehicle is driven; a filter element, which determines a viewing area, from which it is possible to view the contents while the vehicle is driven; the viewing area comprising the point of view of the passenger and not the point of view of the driver.

10 Claims, 3 Drawing Sheets

(51) Int. Cl.
  *B60K 35/22*  (2024.01)
  *B60K 35/81*  (2024.01)
  *B60K 37/00*  (2006.01)
  *B60R 11/02*  (2006.01)
  *G02F 1/1333*  (2006.01)
  *G09G 3/34*  (2006.01)

(52) U.S. Cl.
  CPC .............. *B60K 35/81* (2024.01); *B60K 37/00* (2013.01); *B60R 11/0235* (2013.01); *G02F 1/133308* (2013.01); *G09G 3/3406* (2013.01); *G09G 2320/0247* (2013.01); *G09G 2320/068* (2013.01); *G09G 2360/144* (2013.01); *G09G 2380/10* (2013.01)

(58) Field of Classification Search
  CPC ........... G02F 1/133606; B60R 11/0235; B60R 2011/0005; G02B 2027/0123; G02B 27/01
  See application file for complete search history.

(56) References Cited

U.S. PATENT DOCUMENTS

| | | | | |
|---|---|---|---|---|
| 7,916,241 | B2 * | 3/2011 | Mimura | G03F 7/0007 362/292 |
| 8,305,678 | B2 * | 11/2012 | Kuhlman | H04N 13/351 345/8 |
| 9,477,083 | B2 * | 10/2016 | Weindorf | H05B 47/11 |
| 2005/0212994 | A1 * | 9/2005 | Usami | G02F 1/133509 349/66 |
| 2006/0291243 | A1 * | 12/2006 | Niioka | F21V 33/0052 362/606 |
| 2014/0204131 | A1 * | 7/2014 | Chen | G09G 3/36 345/691 |
| 2014/0333647 | A1 * | 11/2014 | Lee | G02B 27/0179 345/589 |
| 2016/0098692 | A1 * | 4/2016 | Johnson | G06Q 20/047 705/43 |
| 2019/0001908 | A1 * | 1/2019 | Chu | B60R 21/017 |
| 2020/0238684 | A1 * | 7/2020 | Usami | B41F 17/00 |
| 2021/0063783 | A1 * | 3/2021 | Byoun | G09G 3/3696 |
| 2021/0247552 | A1 * | 8/2021 | McCoy | G08B 7/06 |
| 2021/0248978 | A1 * | 8/2021 | Kim | G09G 3/20 |
| 2021/0373205 | A1 * | 12/2021 | Hornstein | G02B 30/27 |
| 2023/0254457 | A1 * | 8/2023 | Robinson | G02F 1/134363 349/1 |
| 2023/0258977 | A1 * | 8/2023 | Ogawa | G02F 1/1323 359/227 |
| 2023/0266506 | A1 * | 8/2023 | Takahashi | G02B 1/11 359/613 |
| 2023/0266511 | A1 * | 8/2023 | Iwama | B32B 27/36 359/599 |

FOREIGN PATENT DOCUMENTS

| | | | |
|---|---|---|---|
| JP | 2001305312 A | | 10/2001 |
| JP | 2004109615 A | * | 4/2004 |
| JP | 2017090846 A | * | 5/2017 |

* cited by examiner

ROAD VEHICLE PASSENGER CONTENT DISPLAY DEVICE AND RELATED ROAD VEHICLE AND CONTROL METHOD

CROSS-REFERENCE TO RELATED APPLICATIONS

This patent application claims priority from Italian Patent Application no. 102022000004592 filed on Mar. 10, 2022, the entire disclosure of which is incorporated herein by reference.

TECHNICAL FIELD

The present invention relates to a road vehicle passenger content display device, a related road vehicle and a related control method.

PRIOR ART

Generally, road vehicles are provided with a plurality of display devices arranged on the dashboard of the road vehicle.

Historically, each road vehicle comprises at least one display device reserved for the driver, for example, screens or indicators arranged on the vehicle's instrument panel, i.e., on the portion of the dashboard interposed between the steering wheel and the windscreen.

In recent years, these devices can be supported by other screens (for example, head-up screens) completing the driver information display.

In some cases, devices have been developed to be viewed by road vehicle passengers. In particular, for the rear seats, real multimedia devices have been developed to enable passengers to view distracting contents, such as films, documentaries, news, etc. These contents can hardly be enjoyed by a passenger sitting in front, next to the driver, without distracting the driver from driving. For this reason, a front passenger screen is rarely dedicated to the front passenger.

In recent years, attempts have been made to circumvent driver distraction by allowing the front passenger to enjoy distracting contents only when the vehicle is stationary. On the other hand, when the vehicle is driven, the front passenger may be permitted to view contents that are deemed not to be distracting, such as speed, route, or other auxiliary driving contents (such as the current gear, lateral accelerations) which, for example, the driver can view on other screens.

However, these solutions limit the entertainment for the front passenger (i.e., sitting next to the driver), thus reducing the pleasure of travelling.

Document FR3074924 discloses a display device wherein the screen is installed centrally on a dashboard and can be oriented, in particular wherein the brightness of said screen is adjusted according to its orientation.

Document EP3730333 discloses a driver display device which allows the head-up display to be expanded by projection onto the windscreen.

Document JP2001305312 discloses a laminated optical body to prevent unnecessary light emission through a liquid crystal panel in the lateral direction.

DESCRIPTION OF THE INVENTION

The object of the present invention is to provide a road vehicle passenger content display device, a related road vehicle and a related control method, which are at least partially free from the drawbacks described above and, at the same time, simple and inexpensive to manufacture.

According to the present invention, a road vehicle passenger content display device, a related road vehicle and a related control method are provided as claimed in the following independent claims, and preferably in any one of the claims directly or indirectly dependent on the independent claims.

The claims describe preferred embodiments of the present invention forming an integral part of the present specification.

BRIEF DESCRIPTION OF THE DRAWINGS

The present invention will now be described with reference to the accompanying drawings, which illustrate some non-limiting embodiments thereof, in which.

PREFERRED EMBODIMENTS OF THE INVENTION

Figure 1:
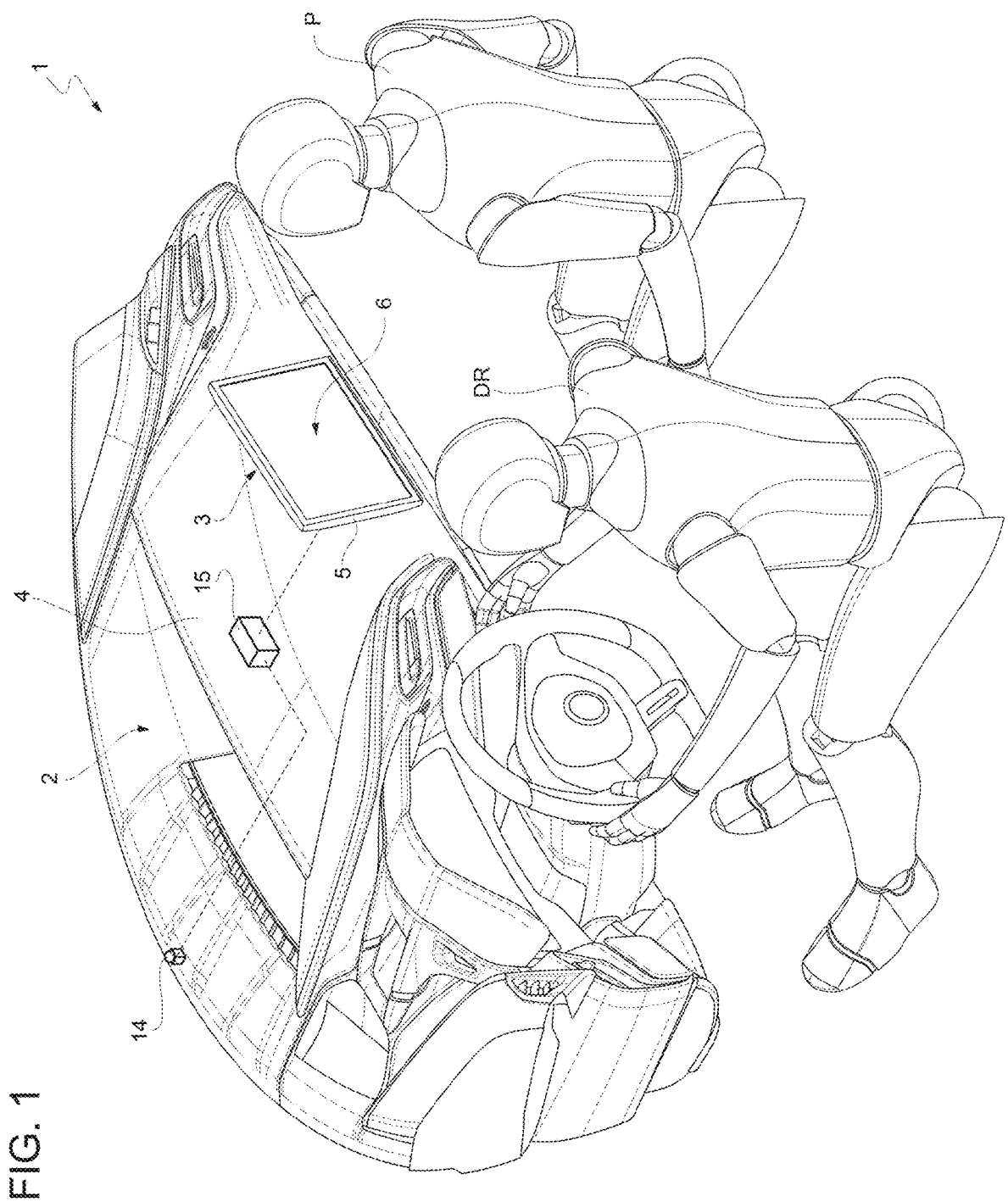
FIG. 1 is a schematic perspective view, with details removed for clarity, of an inner portion of a road vehicle in accordance with the present invention.

In FIG. 1, the numeral 1 schematically indicates a road vehicle driven by a driver DR and equipped with two front wheels and two rear wheels (in particular, driving wheels). The vehicle 1 is provided with a passenger compartment 2, which is adapted to accommodate the driver DR and at least one passenger P next to the driver DR.

Figure 2:
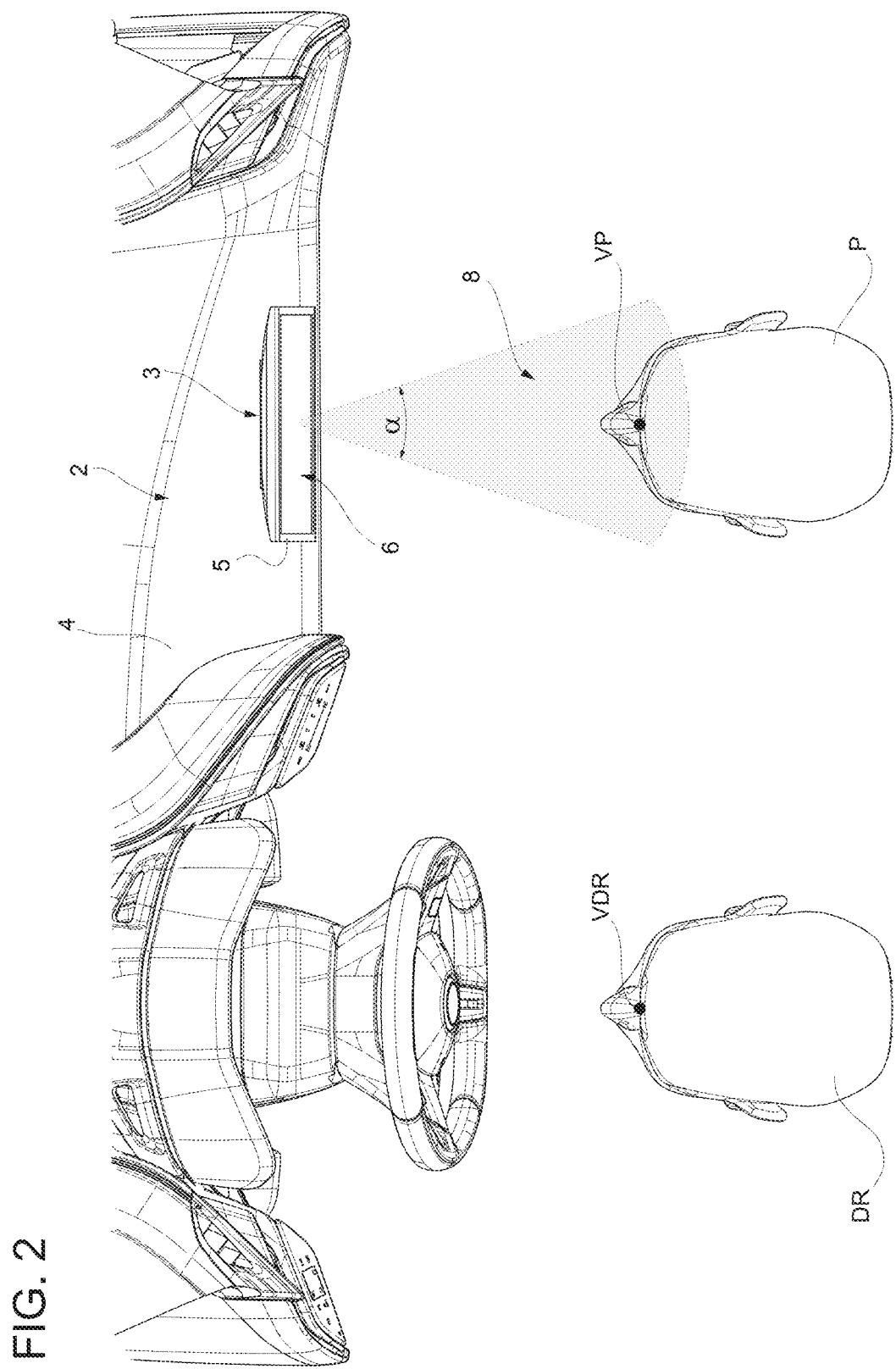
FIG. 2 is a schematic plan view, with details removed for clarity, of the inner portion in FIG. 1, showing a viewing area of a display device.

As shown in the non-limiting embodiments in FIGS. 1 and 2, the vehicle 1 comprises at least one content display device 3 for the passenger P, which is arranged on a vehicle dashboard 4 (integral with, in particular integrated into the dashboard 4), facing the passenger P. In particular, the frontal position of the display device 3 in relation to the passenger is of particular importance for what will be discussed below. The term "frontal" means that the passenger's point of view lies on a line perpendicular to the display device 3.

The device 3 comprises at least one support element 5, which is configured to be mounted on the dashboard 4 of the road vehicle. In particular, the support element 5 may be any plastic or metallic support. In some non-limiting cases, the support device 5 is integrated into the dashboard 4 itself.

The device 3 further comprises a screen 6 mechanically connected to the support element 5 and configured so as to be visible to the passenger P while the road vehicle 1 is driven by the driver DR. Preferably, but without limitation, the screen 6 is a flat screen, that is, a screen that lies in a plane.

Preferably, the support element 5, in particular the screen 6, is integral with the dashboard 4, more particularly integrated into the vehicle dashboard 4.

Advantageously, but not limitingly, the support element 5, in particular the screen 6, is arranged in front of the passenger P along a normal forward moving direction of the vehicle 1.

Advantageously, the display device 3 comprises a filter element 7, which determines a viewing area 8 from which it is possible to view the contents while the vehicle is driven.

In particular, as shown in the non-limiting embodiment in FIG. 2, the viewing area 8 comprises the point of view VP of the passenger P and not the point of view VDR of the driver DR. "Point of view" means the position of at least one of the eyes of the driver DR or passenger P.

In other words, preferably, as mentioned above, the point of view VP of the passenger lies on a line perpendicular to the plane of the screen 6.

Advantageously, but not necessarily, and as shown in the non-limiting embodiment in FIG. 2, the viewing area 8 is defined (delimited) by a viewing angle α between 80° and 15°, particularly between 60° and 20°, more particularly between 25° and 35°.

In some non-limiting cases, not shown, the filter element 7 is arranged as an outer layer of the screen 6 and, in particular, comprises a polarized film limiting its viewing angle.

Figure 3:
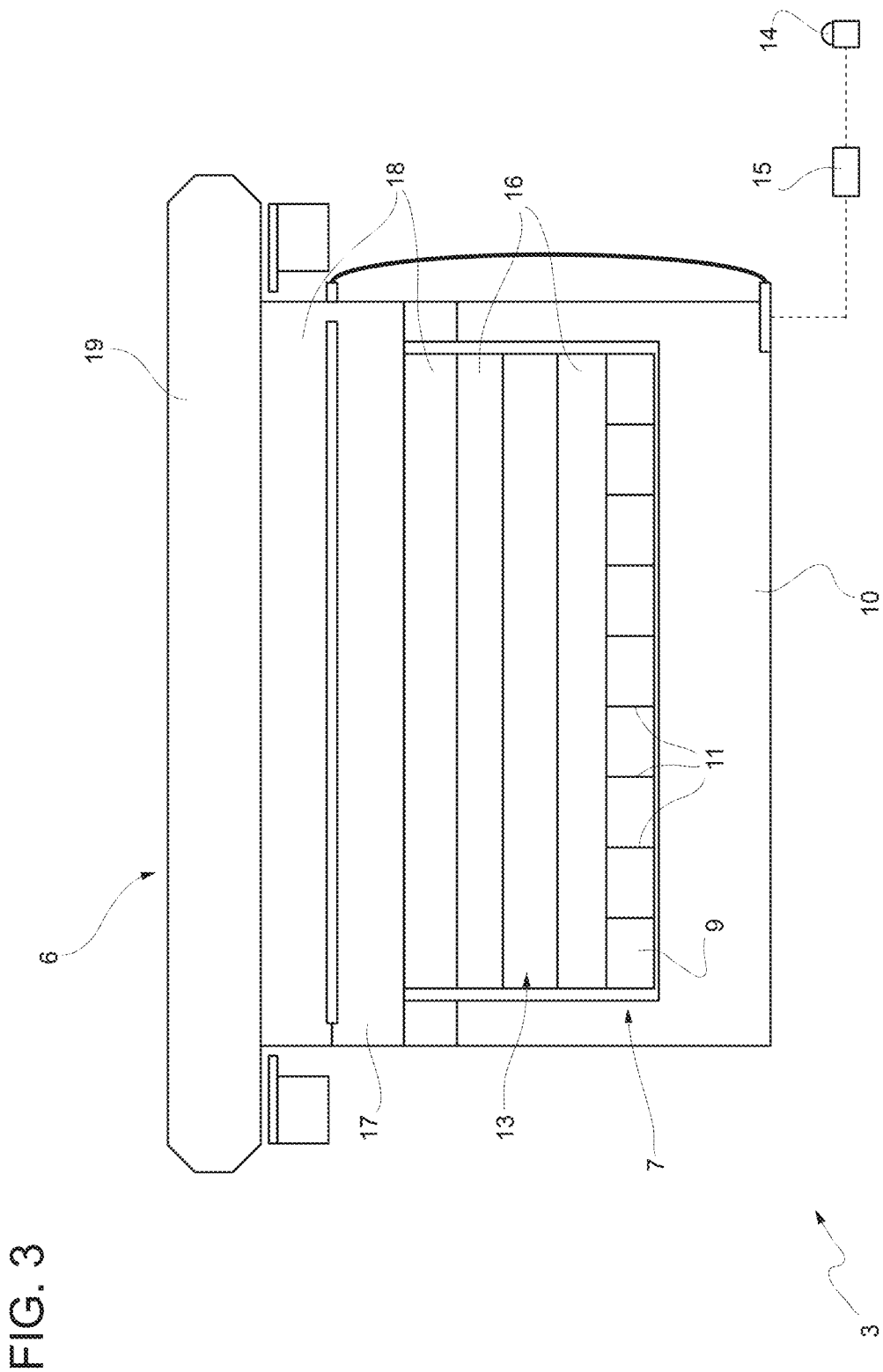
FIG. 3 is a plan, sectional and schematic view of a non-limiting embodiment of a content display device in accordance with the present invention.

In other preferred but non-limiting cases, such as the one shown in FIG. 3, the filter element 7 of the device 3 is arranged inside the screen and, in particular, comprises a first louver filter 9 (of a known type), also known as the "light control film" (LCF) filter. As is known, the aperture and depth of these louvers determine the viewing angle α, since light passage is only permitted to rays with a component perpendicular to the screen above a certain threshold.

Advantageously, but not limitingly, the device 3 comprises a backlighting element 10 (of a known type and not further detailed below). Preferably, the first louver filter 9 comprises a series of bulkheads 11 configured to block some of the light rays coming from the backlighting element so as to limit the viewing area 8. As mentioned above, in fact, the distance and length of the bulkheads 11 determine the viewing angle α.

In particular, the viewing angle α is calculated and predefined according to the ergonomics of the vehicle 1. In other words, for example, while ensuring that the driver DR is prevented from viewing distracting contents, a dashboard 4 (i.e., a screen 6) which is closer to the passenger P allows a wider viewing angle α compared to a dashboard 4 which is very far from the passenger P.

As shown in the non-limiting embodiment in FIG. 3, representing a sectional plan view of the device 3, the first filter 9 is arranged so that the bulkheads 11 are in a substantially vertical position, i.e., so as to limit the viewing area 8 horizontally.

According to some non-limiting embodiments, not shown, the display device 3 comprises a second louver filter, which is arranged so that its bulkheads 11 are in a substantially horizontal position, i.e., so as to limit the viewing area 8 vertically. It is thus possible to eliminate or in any case reduce possible reflections on the windscreen, making it also easier for the driver to see the road ahead.

According to some non-limiting cases, such as that shown in FIG. 3, the first louver filter 9 is interposed between the backlighting element 10 and an image generating element 13. In particular, the image generating element 13 is a liquid crystal display, more precisely of the TFT or IPS type. This in particular prevents the passenger P or the driver from removing or inadvertently damaging the filter 9.

Advantageously, but not necessarily, the vehicle 1 further comprises a sensor element 14, which is configured to sense the light present outside the road vehicle. Preferably, the twilight sensor present in most of the vehicles on the market is used as the sensor element 14. For example, the sensor element 14 is configured to detect the lux outside the vehicle.

According to some preferred but non-limiting embodiments, the road vehicle 1 further comprises a control unit 15 (of a known type and therefore not shown and not further detailed), which is configured to adjust the brightness of the display device according to what is detected by the sensor element. Physically, the control unit can be composed of a single device or of multiple devices separate from each other and communicating through, for example, the CAN network of the road vehicle 1.

In the non-limiting embodiment in FIG. 3, the image generating element 13 is interposed between two polarizers 16.

Advantageously, but not necessarily, the screen 6 is a touch screen and therefore comprises a touch panel 17. In particular, the panel 17 is interposed between two OCRs 18 (Optically-Clear Resins), i.e., transparent resinous elements used to mitigate the stress on the panel 17, and prevent the formation of condensation and the entry of foreign bodies. More particularly, the touch panel 17 is interposed between the image generating element 13 and a glass 19, which, in use, is directly used as an interface by the passenger P to interact with the screen 6.

Advantageously, but not necessarily, the filter 9 has a thickness of less than 5 mm, in particular substantially equal to 3 mm.

In accordance with a further aspect of the present invention, a method for displaying contents to a passenger of a road vehicle is described below.

In particular, the method comprises at least the steps of: transmitting by means of the display device 3 distracting contents to the passenger P and filtering the light transmission of the same while preventing the driver DR from viewing them. More precisely, the filtering step is carried out by at least the first louver filter 9 as described above.

Advantageously, but not necessarily, the method comprises the further steps of detecting the amount of light present outside the vehicle 1 by means of the sensor element 14; and adjusting, by means of the control unit 15, the brightness of the backlighting element 10 of the display device 3 according to what is detected by the sensor element 14.

In particular, it must be taken into consideration that not adjusting the brightness when the external brightness drops would still allow the driver, in conditions of external darkness and high brightness of the screen 6, to view the distracting contents. As is known, in fact, the human eye becomes more sensitive in dark conditions. Therefore, preferably, by means of suitable test tables, the external brightness values detected by the sensor element 14 are correlated with the brightness of the backlighting element 10, i.e., the screen 6. For example, in the event that the sensor element 14 detects an unlit, night-time outdoor condition of 0 lux, the control unit 15 sets the brightness of the screen to 5 candelas. Otherwise, if tens of thousands of lux are detected externally, the control unit 15 sets the brightness of the screen 6 to 500 or more candelas. The correlation between the external brightness and the brightness of the screen 6 is not strictly linear, therefore suitable reference tables are used.

Preferably, the step of adjusting the brightness is carried out by including a damping parameter, which prevents sudden changes in brightness of the device 3 in case of inconstant detection by the sensor element 14. For example, the damping parameter prevents the screen 6 from flickering if the vehicle passes under a tree-lined avenue (a condition in which the sensor element 14 detects peaks and valleys of external brightness in rapid succession).

Alternatively or additionally, the step of adjusting the brightness is carried out by including a doping parameter, which causes sudden changes in brightness of the screen 6 in case of a change in brightness constantly detected by the sensor element 14, for example, when entering or exiting a tunnel, where, in fact, the external brightness changes suddenly but maintains a substantially constant value (in fact, the sensor element 14 detects a rapid change in the internal brightness, which however remains constant over time, unlike the case of the tree-lined avenue).

Although the invention described above makes particular reference to a very precise embodiment, it is not to be construed as limited to this embodiment, since all the variations, modifications or simplifications covered by the attached claims, such as, for example, a different type of screen, a different position of the device 3, a different type of vehicle (for example, a two-wheeled or front-wheel drive vehicle), etc., fall within its scope.

The present invention has several advantages.

First of all, it prevents distraction for the driver, while increasing the pleasure of travelling for the passenger, who can serenely view contents which, if available to the driver, could lead to carelessness or accidents.

Furthermore, the present invention prevents a user from removing or damaging the filter element (as in the case of an outer film), ensuring that the driver stays focused.

A further advantage of the present invention is that it is possible to dynamically adjust the brightness of the display device, preventing the driver from viewing the contents obscured by the filter element in particularly dark conditions.

Finally, the present invention allows the above method to be carried out without the need to install additional sensors, but simply by using the twilight sensor present on board most of the vehicles on the market today, for example where the vehicle dome light is located.

LIST OF REFERENCE NUMBERS IN THE FIGURES 1 vehicle
2 passenger compartment
3 display device
4 vehicle dashboard
5 support element
6 screen
7 filter element
8 viewing area
9 first filter
10 backlighting element
11 bulkheads
13 image generating element
14 sensor element
15 control unit
16 polarizers
17 touch panel
18 OCR
19 glass
DR driver
P passenger
VDR driver's point of view
VP passenger's point of view
A viewing angle

The invention claimed is:

1. A content display device (3) for a passenger (P) of a road vehicle (1); the content display device (3) comprising:
   a support element (5) configured to be mounted on a dashboard (4) of the road vehicle (1), integral with the dashboard (4);
   at least one screen (6) mechanically connected to support element (5) and configured so as to be visible to the passenger (P) while the vehicle is driven;
   a filter element (7), which determines a viewing area (8), from which it is possible to view the contents while the vehicle is driven; the viewing area (8) comprising the point of view (VP) of the passenger (P) lying in a line perpendicular to the content display device and not the point of view (VDR) of a driver (DR), and wherein the filter element (7) comprises a first louver filter (9) having a thickness of greater than 3 mm and less than 5 mm and arranged inside the screen (6), thereby preventing the passenger (P) or the driver (DR) from removing or inadvertently damaging the filter (9) configured to limit the viewing area horizontally, wherein the first louver filter (9) comprises a series of bulkheads (11) vertically arranged, wherein each of series of bulkheads is perpendicular to the at least one screen having a distance therebetween and a length effective to limit the viewing area (8) horizontally and prevent the driver from viewing content displayed on the content display device;
   the at least one screen (6) comprising an image generating element (13) directly interposed between two polarizers (16), wherein a bottommost polarizer of the two polarizers (16) is positioned in direct contact with the first louver filter (9);
   a sensor element (14) configured to sense the amount of light present outside the road vehicle (1); and
   a control unit (15) configured to adjust the brightness of the display device (3) according to what is detected by the sensor element (14), wherein correlation between the amount of light present outside the road vehicle and the brightness of the display device is not linear and is provided by a reference table.

2. The device (3) according to claim 1, wherein the viewing area (8) is defined by a viewing angle ($\alpha$) between 80° and 15°.

3. The device (3) according to claim 1, further comprising a backlighting element (10); wherein the series of bulkheads (11) are configured to block some of the light rays coming from the backlighting element (10) so as to limit the viewing area (8).

4. The device (3) according to claim 2, wherein the first louver filter (9) is interposed between a backlighting element (10) and the image generating element (13).

5. A road vehicle (1) comprising:
   a passenger compartment (2) configured to accommodate a driver (DR) and at least one passenger (P) alongside the driver (DR);
   a vehicle dashboard (4);
   a passenger (P) content display device (3) according to claim 1, which is arranged on the vehicle dashboard (4), facing the passenger (P) and wherein the viewing area (8) prevents the driver (DR) from viewing the contents.

6. A method for displaying contents to a passenger (P) of a road vehicle (1); the method comprising the steps of:
   transmitting by means of a display device (3) distracting contents to a passenger (P) of the road vehicle (1) placed beside a driver (DR);
   filtering the light transmission of the same while preventing the driver (DR) from viewing them;

detecting an amount of light present outside the road vehicle (1) by means of a sensor element (14); and adjusting, by means of a control unit (15), a brightness of a backlighting element (10) of the display device (3) according to what is detected by the sensor element (14);

wherein correlation between the amount of light present outside the road vehicle and the brightness of the display device is not linear and is provided by a reference table, and wherein the filtering step is carried out by at least a first louver filter (9) having a thickness greater than 3 mm to less than 5 mm configured to limit the viewing area horizontally and prevent the driver from viewing the light transmission, wherein the first louver filter (9) comprises a series of bulkheads (11) vertically arranged, wherein each of the series of bulkheads is perpendicular to a screen of the display device having a distance therebetween and a length effective to limit the viewing area (8) horizontally and prevent the driver from viewing content displayed on the content display device, and wherein the filtering step comprises providing the first louver filter (9) arranged inside the screen of the display device (3), the first louver filter (9) in direct contact with a bottommost polarizer of two polarizers (16), the two polarizers (16) having directly therebetween an image generating element (13), thereby preventing the passenger (P) or the driver (DR) from removing or inadvertently damaging the filter (9).

7. The method according to claim 6, wherein the step of adjusting the brightness is carried out by including a damping parameter, which prevents sudden changes in brightness in case of inconstant detection by the sensor element (14).

8. The method according to claim 6, wherein the step of adjusting the brightness is carried out by including a doping parameter, which causes sudden changes in brightness in case of a change in brightness constantly detected by the sensor element (14).

9. The use of a device (3) according to claim 1 for the viewing of contents by a passenger (P) arranged alongside a driver (DR) of a road vehicle (1).

10. A content display device (3) for a passenger (P) of a road vehicle (1); the content display device (3) comprising:

a support element (5) configured to be mounted on a dashboard (4) of the road vehicle (1), integral with the dashboard (4);

at least one screen (6) mechanically connected to the support element (5) including an image generating element and configured so as to be visible to the passenger (P) while the vehicle is driven;

a filter element (7) comprising a first louver filter (9); and a backlighting element (10);

a sensor element (14) configured to sense the amount of light present outside the road vehicle (1); and a control unit (15) configured to adjust the brightness of the display device (3) according to what is detected by the sensor element (14), wherein correlation between the amount of light present outside the road vehicle and the brightness of the display device is not linear and is provided by a reference table, wherein the filter element (7) is intermediate the backlighting element and the screen, and wherein the first louver filter (9) having a thickness greater than 3 mm and less than 5 mm comprises a series of vertically oriented bulkheads (11) perpendicular to the at least one screen having a distance therebetween and a length effective to limit the viewing area (8) horizontally and are configured to block some of the light rays coming from the backlighting element (10) so as to prevent the driver from viewing content displayed on the content display device, and wherein the first louver filter (9) is arranged inside the screen (6), thereby preventing the passenger (P) or the driver (DR) from removing or inadvertently damaging the filter (9); and wherein the image generating element (13) is directly interposed between two polarizers (16), wherein a bottommost polarizer of the two polarizers (16) is positioned in direct contact with the first louver filter (9).

* * * * *